Patented Feb. 16, 1926.

1,573,632

UNITED STATES PATENT OFFICE.

RUSSELL B. CROWELL, OF AGNEW, CALIFORNIA, ASSIGNOR TO WESTERN INDUSTRIES COMPANY, OF AGNEW, CALIFORNIA, A CORPORATION OF CALIFORNIA.

PROCESS FOR PRODUCING LIGHT BASIC MAGNESIUM CARBONATE.

No Drawing.     Application filed June 26, 1925. Serial No. 39,819.

*To all whom it may concern:*

Be it known that I, RUSSELL B. CROWELL, a citizen of the United States, residing at Agnew, in the county of Santa Clara and State of California, have invented certain new and useful Improvements in Processes for Producing Light Basic Magnesium Carbonate, of which the following is a specification.

The present invention relates to a process for producing a light basic magnesium carbonate from calcined magnesite (MgO) possessing the physical properties of a low density and a high mechanical strength to a degree especially adapted for the manufacture of heat insulating materials therefrom.

Heat insulating materials consisting essentially of a basic magnesium carbonate must possess both a low density to insure a high heat insulating value and a high mechanical strength to meet commercial demands in satisfactory manner. In addition to possessing the physical properties of low density and high strength insulating materials should contain at least 85% basic magnesium carbonate and not less than 10% of a binder such as asbestos.

Various processes have been proposed for producing basic magnesium carbonate which is especially adapted for the manufacture of heat insulating materials. One of such processes consists in the precipitation of basic magnesium carbonate from brines by means of a soluble carbonate. Another process by which the bulk of the basic magnesium carbonate used for the manufacture of insulating materials is produced consists in preparing a solution of magnesium bicarbonate from magnesite or dolomite, and then boiling such solution until the bicarbonate is converted to the basic magnesium carbonate. Heat insulating materials, including as an essential constituent thereof, basic magnesium carbonates produced by either of these processes are dependent for their mechanical strength upon the step of molding being conducted under pressures ranging from 45 pounds or more per square inch upward.

Another process of making light basic magnesium carbonate adapted for heat insulating purposes, first proposed by Reuff, consists in forming an aqueous suspension of magnesium oxide (MgO), introducing carbon dioxide gas into the suspension, and then submitting the mixture to a heat treatment whereupon light basic magnesium carbonate is formed. This process is open to objections in that the basic magnesium carbonate produced not only varies in chemical composition with each successive batch produced, but also does not exhibit the desirable properties of low density and high mechanical strength when molded and in a dry state. Another objectionable feature is the fact that by this process basic magnesium carbonates are produced which vary widely in chemical composition; or even if of the same composition in successive batches, the physical properties of density and mechanical strength when molded and in a dry state vary widely. It is possible by this same process to produce magnesium carbonates of almost any composition between the normal trihydrate and the hydroxide, and only a comparatively small number of the many possible basic magnesium carbonates which may result are suitable for the manufacture of commercial heat insulating magnesium products. The absence of control over the process and the wide variations in the chemical and physical properties of the product, have prevented the commercial development of this process.

As a result of investigations with the foregoing in mind I have discovered that various factors which enter into the mode of manufacture of light basic magnesium carbonate from magnesium oxide determine the physical properties density and mechanical strength of the molded and dry product. Such factors as the physical condition of the magnesium oxide, the relative proportions of the magnesium oxide and the water in the forming of aqueous suspension of magnesium oxide, the amount of carbon dioxide caused to react with the aqueous suspension of magnesium oxide, the temperatures to which the reacting mass is heated, and the time the reacted mass is agitated all play an important part in the formation of the production of a light basic magnesium carbonate having the properties of a low density and a high mechanical strength to the requisite degree when molded and in a dry state. By suitably controlling these factors in the process of producing light basic magnesium carbonate from magnesium oxide, a basic magnesium carbonate can be produced which will exhibit the properties to a degree particularly adapted for the manufacture of heat insulating materials consisting essentially of basic magnesium carbonate.

Accordingly, one of the objects of the invention is to provide an improved process for the manufacture of a light basic magnesium carbonate in which the concentration or the relative proportions of the magnesium oxide and water of the aqueous suspension of magnesium oxide the amount of carbon dioxide absorbed, the temperature of the reacting mass, and the time period in which the reacted mass is agitated are all suitably controlled to produce compounds having desired predetermined physical properties.

Another object of the invention is to provide a light basic magnesium carbonate which exhibits the physical properties of a low density and a high mechanical strength to the desired degree when in a dry state.

A further object of the invention is the production of a light basic magnesium carbonate particularly adapted for the manufacture of heat insulating material containing at least 85% basic magnesium carbonate having a definite low density and accurately defined high mechanical strength by low pressure molding.

Other and further objects of the invention will appear from the more detailed description of the invention set forth below, it being understood that various changes may be made therein by those skilled in the art, without departing from the scope and spirit of the invention.

In carrying out the invention I preferably take calcined magnesite containing not less than 88% magnesium oxide (MgO) by weight, ground to pass a mesh not less than 180 and preferably more than 200, and form a mixture with water in the proportions of 500 pounds of magnesium oxide to 1000 gallons, in a suitable tank. Carbon dioxide gas is passed into the aqueous suspension of magnesium oxide. During the introduction of the carbon dioxide the mixture may be agitated by mechanical means or by air present in the carbon dioxide or introduced separately. The temperature during carbonation is maintained less than 120° F. The carbonation tank should be provided with a jacket or cooling coil through which a flow of water should circulate to provide a means of controlling the temperature.

The carbonation is continued until the ratio of carbon dioxide ($CO_2$) to the magnesium oxide (MgO) lies between the limits of 0.8 to 0.9. This point may be determined in any suitable manner. One method which has proven to be satisfactory is to lead the gas passing out of the carbonating tank through an orifice and note the rise in pressure as the carbonation proceeds. If the carbonator is built for maximum contact between $CO_2$ and MgO, the rise in pressure will be small until the ratio of $CO_2$ to MgO approaches 0.8 whereupon the pressure will rise more rapidly. The pressure obtained when the ratio is 0.8 to 0.9 is quickly determined. Another method is to analyze the gas entering and leaving the carbonating tank, and noting the rise in the percentage of $CO_2$ in the exit gas as the ratio approaches 0.8. In this latter method a constant amount of air must be admitted with the $CO_2$.

After the carbonation is completed, the mixture is then heated gradually under constant agitation until the ratio of the volume of the basic magnesium carbonate to the total volume lies between the limits 0.50 to .66. The limits 0.5 to .66 apply only to an original mixture of 500 pounds magnesium oxide per 1000 gallons of water; if other proportions are used these percentages are affected proportionately. The volume of the suspended basic magnesium carbonate is determined by separating the magnesium carbonate from a given volume of the mixture on a suitable suction filter, and measuring the apparent volume of the wet magnesium carbonate. The purpose of this heating operation is to reduce the apparent density of the basic magnesium carbonate. The heating is conducted at a temperature of not less than 120 degrees Fahrenheit and not more than 140 degrees Fahrenheit, for a period of from one to three hours.

The proportions of magnesium oxide and water given in the process detailed above to make up or form the aqueous suspension of magnesium oxide are not to be construed as limiting the process as other proportions can be used. The best results are obtained, however, when the proportions of magnesium oxide to the water used in making the suspension fall within the ratio of not less than 360 pounds and not more than 650 pounds of magnesium oxide to 1000 gallons of water.

The basic magnesium carbonate thus formed may be admixed with a binder such as asbestos, molded into the customary shapes and dried. The proportions of the binder used should not be less than 8 parts and not more than 14 parts to 92 or 86 parts respectively of the light basic magnesium carbonate. A preferable admixture of basic magnesium carbonate and a binder for heat insulating material comprises 90 parts of the carbonate to 10 parts of the binder.

The light basic magnesium carbonate produced by this process when utilized in the manufacture of heat insulating materials possesses the advantage of being especially adapted for low pressure or vacuum molding, with the heat insulating material resulting from such molding showing mechanical strength to a higher degree than is obtainable in heat insulating materials utilizing basic magnesium carbonate produced by other processes molded under high pressures. In the manufacture of heat insulating materials utilizing basic magnesium carbonate produced by prior processes it is necessary to subject the insulating composition to a pressure of 45 pounds or more per square inch in order to cause such materials to exhibit the requisite degree of mechanical strength. With the basic magnesium carbonate produced by this process, insulating materials can be made by low pressure or vacuum molding, or at a pressure of from 10 pounds to 15 pounds per square inch, with the insulating material having high mechanical strength and low density. By low density is meant density within the range of 14 to 17 pounds per cubic foot and by high mechanical strength is meant that the average transverse breaking load in pounds per inch of width as determined by supporting the specimen (block) on knife edges ten inches apart and loading at the center is not less than that required by the following formula:

$$S = 0.3 T^2 W.$$

$S$ = Transverse breaking load in pounds per inch of width.
$T$ = Thickness (depth in inches).
$W$ = Weight of material pounds per cubic foot.

It has been heretofore attempted to manufacture heat insulating materials containing at least 85% basic magnesium carbonate having a high mechanical strength to the desired degree by low pressure molding, but such attempts have met with little success due to the fact that the magnesium carbonate as now produced does not possess the requisite physical properties.

Having described my invention, what is desired to be secured by Letters Patent and claimed as new is:

1. In a process of producing light basic magnesium carbonate, the step which comprises reacting carbon dioxide gas with magnesium oxide in an aqueous medium at a temperature not exceeding 120 degrees Fahrenheit, until the ratio of carbon dioxide to magnesium oxide lies between the limits of 0.8 to 0.9.

2. In a process of producing light basic magnesium carbonate, the steps which comprise reacting carbon dioxide gas with magnesium oxide in an aqueous medium until the ratio of $CO_2$ to $MgO$ lies between the limits of 0.8 to 0.9, and heating the reacted mass.

3. In a process of producing light basic magnesium carbonate, the steps which comprise reacting carbon dioxide gas with magnesium oxide in an aqueous medium until the ratio of $CO_2$ to $MgO$ lies between the limits of 0.8 to 0.9, and heating the reacted mass to a temperature not exceeding 140 degrees Fahrenheit.

4. In a process as set forth in claim 3 in which the reacted mass is retained at a temperature not exceeding 140 degrees Fahrenheit until the ratio of the volume of the basic magnesium carbonate to the total volume lies between the limits (1 to 1.32) + the number of pounds of $MgO$ per gallon of original mixture.

5. A process of producing light basic magnesium carbonate which comprises reacting carbon dioxide gas with magnesium oxide in an aqueous medium until the ratio of $CO_2$ to $MgO$ lies within the limits of 0.8 to 0.9, heating the reacting mass under constant agitation, and recovering the product thus formed.

6. A process of producing light basic magnesium carbonate which comprises reacting carbon dioxide gas with magnesium oxide in an aqueous medium until the ratio of $CO_2$ to $MgO$ lies within the limits of 0.8 to 0.9, heating the reacting mass under constant agitation to a temperature not exceeding 140 degrees Fahrenheit until the ratio of the volume of the carbonate to the total volume lies between the limits (1 to 1.32) + the number of pounds of $MgO$ per gallon of original mixture, and recovering the product thus formed.

In testimony whereof I affix my signature.

RUSSELL B. CROWELL.

adapted for low pressure or vacuum molding, with the heat insulating material resulting from such molding showing mechanical strength to a higher degree than is obtainable in heat insulating materials utilizing basic magnesium carbonate produced by other processes molded under high pressures. In the manufacture of heat insulating materials utilizing basic magnesium carbonate produced by prior processes it is necessary to subject the insulating composition to a pressure of 45 pounds or more per square inch in order to cause such materials to exhibit the requisite degree of mechanical strength. With the basic magnesium carbonate produced by this process, insulating materials can be made by low pressure or vacuum molding, or at a pressure of from 10 pounds to 15 pounds per square inch, with the insulating material having high mechanical strength and low density. By low density is meant density within the range of 14 to 17 pounds per cubic foot and by high mechanical strength is meant that the average transverse breaking load in pounds per inch of width as determined by supporting the specimen (block) on knife edges ten inches apart and loading at the center is not less than that required by the following formula:

$$S = 0.3 T^2 W.$$

S = Transverse breaking load in pounds per inch of width.
T = Thickness (depth in inches).
W = Weight of material pounds per cubic foot.

It has been heretofore attempted to manufacture heat insulating materials containing at least 85% basic magnesium carbonate having a high mechanical strength to the desired degree by low pressure molding, but such attempts have met with little success due to the fact that the magnesium carbonate as now produced does not possess the requisite physical properties.

Having described my invention, what is desired to be secured by Letters Patent and claimed as new is:

1. In a process of producing light basic magnesium carbonate, the step which comprises reacting carbon dioxide gas with magnesium oxide in an aqueous medium at a temperature not exceeding 120 degrees Fahrenheit, until the ratio of carbon dioxide to magnesium oxide lies between the limits of 0.8 to 0.9.

2. In a process of producing light basic magnesium carbonate, the steps which comprise reacting carbon dioxide gas with magnesium oxide in an aqueous medium until the ratio of $CO_2$ to $MgO$ lies between the limits of 0.8 to 0.9, and heating the reacted mass.

3. In a process of producing light basic magnesium carbonate, the steps which comprise reacting carbon dioxide gas with magnesium oxide in an aqueous medium until the ratio of $CO_2$ to $MgO$ lies between the limits of 0.8 to 0.9, and heating the reacted mass to a temperature not exceeding 140 degrees Fahrenheit.

4. In a process as set forth in claim 3 in which the reacted mass is retained at a temperature not exceeding 140 degrees Fahrenheit until the ratio of the volume of the basic magnesium carbonate to the total volume lies between the limits (1 to 1.32) + the number of pounds of $MgO$ per gallon of original mixture.

5. A process of producing light basic magnesium carbonate which comprises reacting carbon dioxide gas with magnesium oxide in an aqueous medium until the ratio of $CO_2$ to $MgO$ lies within the limits of 0.8 to 0.9, heating the reacting mass under constant agitation, and recovering the product thus formed.

6. A process of producing light basic magnesium carbonate which comprises reacting carbon dioxide gas with magnesium oxide in an aqueous medium until the ratio of $CO_2$ to $MgO$ lies within the limits of 0.8 to 0.9, heating the reacting mass under constant agitation to a temperature not exceeding 140 degrees Fahrenheit until the ratio of the volume of the carbonate to the total volume lies between the limits (1 to 1.32) + the number of pounds of $MgO$ per gallon of original mixture, and recovering the product thus formed.

In testimony whereof I affix my signature.

RUSSELL B. CROWELL.

---

Certificate of Correction.

It is hereby certified that in Letters Patent No. 1,573,632, granted February 16, 1926, upon the application of Russell B. Crowell, of Agnew, California, for an improvement in "Processes for Producing Light Basic Magnesium Carbonate," errors appear in the printed specification requiring correction as follows: Page 3, line 78, claim 4, and line 99, claim 6, strike out the plus sign (+) and insert the multiplication sign (×); and that the said Letters Patent should be read with these corrections therein that the same may conform to the record of the case in the Patent Office.

Signed and sealed this 27th day of April, A. D. 1926.

[SEAL.]

M. J. MOORE,
*Acting Commissioner of Patents.*

Certificate of Correction.

It is hereby certified that in Letters Patent No. 1,573,632, granted February 16, 1926, upon the application of Russell B. Crowell, of Agnew, California, for an improvement in "Processes for Producing Light Basic Magnesium Carbonate," errors appear in the printed specification requiring correction as follows: Page 3, line 78, claim 4, and line 99, claim 6, strike out the plus sign (+) and insert the multiplication sign (×); and that the said Letters Patent should be read with these corrections therein that the same may conform to the record of the case in the Patent Office.

Signed and sealed this 27th day of April, A. D. 1926.

[SEAL.]
M. J. MOORE,
*Acting Commissioner of Patents.*